Jan. 16, 1945.  D. G. BRANDT  2,367,285
NATURAL GAS RECYCLING PROCESS
Filed May 23, 1942
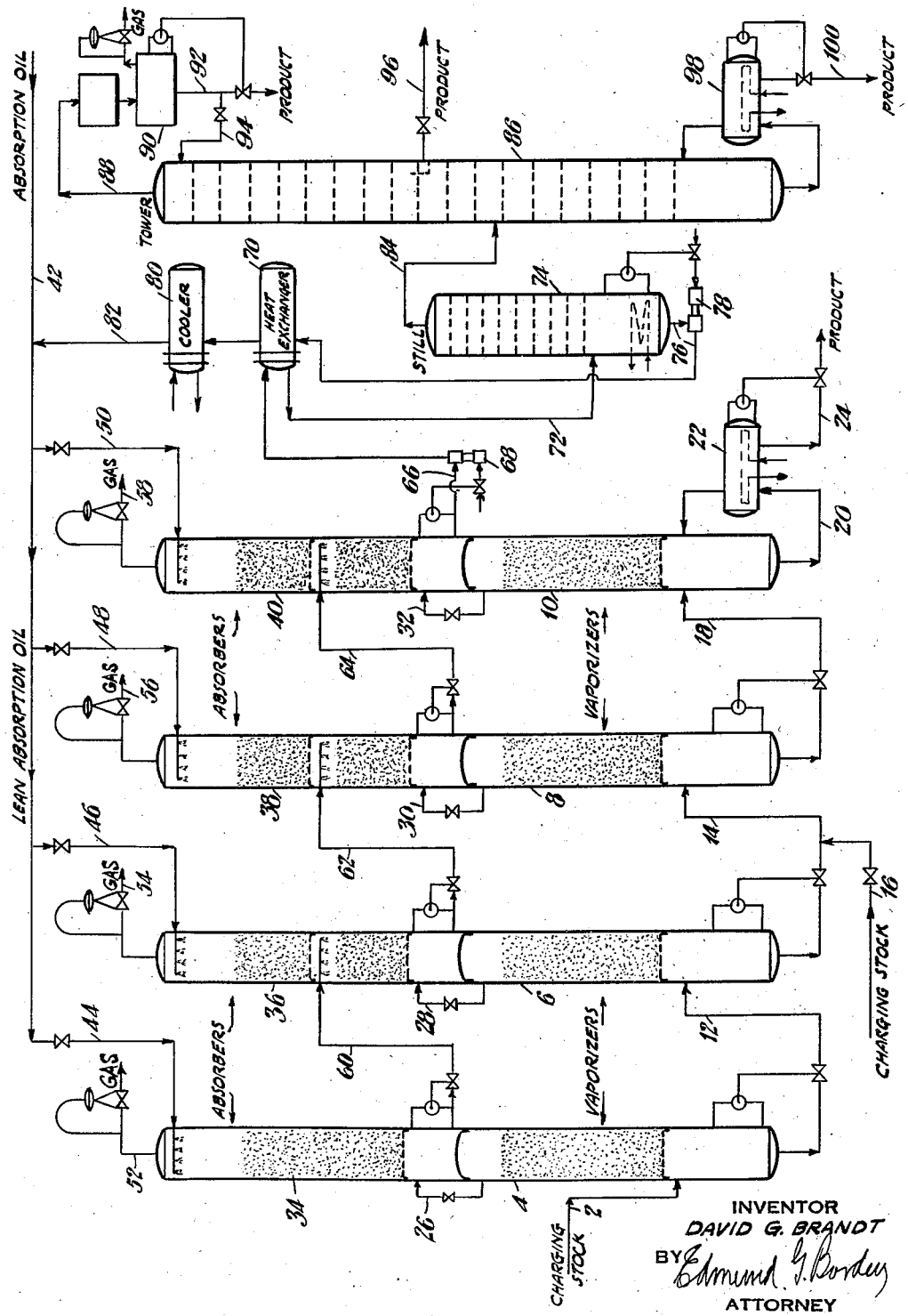
INVENTOR
DAVID G. BRANDT
BY Edmund G. Borden
ATTORNEY Patented Jan. 16, 1945

2,367,285

UNITED STATES PATENT OFFICE 2,367,285

NATURAL GAS RECYCLING PROCESS

David G. Brandt, Westfield, N. J., assignor to Cities Service Oil Company, New York, N. Y., a corporation of Pennsylvania Application May 23, 1942, Serial No. 444,181

4 Claims. (Cl. 196—8)

This invention relates to improvement in the recovery of oil from high pressure distillate producing formations, and more particularly to improvements in the well-known recycling procedure for recovering oil from "condensate" reservoirs.

A number of high pressure oil producing operations are now carried out which are known as recycling or "cycling" operations in which the producing formation or reservoir does not produce oil in the normal way, but produces oil as a "condensate" or "distillate" carried in natural gas at high pressure. An explanation of this type of oil recovery is contained in an article by Ralph H. Nielson of the Pennsylvania State College, "Molecular explanation of retrograde condensation," published in "Refiner" for February 1942, pages 68 to 70.

Under the conditions existing in condensate reservoirs the high pressure gas (2000 to 6000 lbs. per square inch) is apparently so dense that it is able to carry considerable quantities of hydrocarbons boiling as high as 550° F. or higher. It is quite likely that as the mixture in the producing formation moves into the producing well and rises therein, the resulting cooling causes the formation of some liquid but the velocity in the well casing is usually so high that any such liquid would be carried along as a mist. The pressure reduction in the well casing would also result in further release of liquid. In any case by the time the production reaches the recovery plant, usually through relatively long transmission lines, considerable liquid will be present and recoverable as "distillate."

As far as known, all liquid hydrocarbons recovered from cycling operations are handled together in the same plant, regardless of the fact that there is always an initial distillate or liquid present in the mixture by the time the production reaches the plant.

The primary object of the present invention is to provide an improved process by which the entire liquid recovery from the plant may be handled effectively in connection with an absorption operation and in which the normal distillate production may be separately handled in case of damage or shut-down of the absorption recovery system.

According to this and other objects, the improved process comprises the steps of passing all of the production from the cycling operation into the first of a series of vaporizers maintained at progressively lower pressures, the unvaporized material from each vaporizer being passed into the succeeding vaporizer to separate out low boiling constituents, passing the vapor constituents from each of the vaporizers into a separate absorption tower to recover desirable constituents at approximately the pressures maintained in the respective vaporizers, introducing lean absorption oil into the upper portion of each absorption tower, passing rich absorption oil from each absorption tower except the last into the next lower pressure absorption tower at an intermediate point therein, removing the resulting absorption oil from the last absorption tower and recovering the absorbed constituents therefrom.

The improved process of the present invention includes other features and objects as will be apparent to those skilled in the art from the following detailed description of the improved process taken in connection with the accompanying drawing in which the single figure is a diagrammatic flow sheet illustrating an apparatus assembly in which the improved process may be carried out.

Referring to the drawing, the high pressure production from the gathering system of the cycling operation at a pressure of from 2000 to 3000 lbs. per square inch is introduced into the recovery apparatus through a valved line 2. The liquid and gaseous constituents preferably at a temperature at least as low as about 80° F. is introduced into the first of a series of vaporizers 4, 6, 8 and 10. The temperatures in producing formations of the distillate type usually run about 200° F. or above, so that while there is considerable cooling and pressure reduction in the well casings and transmission lines, it is usually necessary to provide atmospheric and heat exchange coolers for cooling the material prior to introducing it into the vaporizer 4. However, such cooling may be dispensed with where there is a considerable pressure drop at the valve in line 2, since some of the liquid will be vaporized and considerable cooling will take place in the vaporizer.

The pressure maintained in the vaporizer 4 preferably approximates 2000 lbs. per square inch and the unvaporized material collected therein is passed through a float valve controlled line 12 in which the pressure is reduced to about 1500 lbs. per square inch and then conducted into the second vaporizer 6 which is maintained at about the last-mentioned pressure. The unvaporized material collected in the bottom of the vaporizer 6 is conducted at still lower pressure through a float valve controlled line 14 into the vaporizer 8 where a pressure of about 1100 lbs. per square inch is maintained. In certain areas some relatively low pressure production is obtained in addition to high pressure production, in which case such material, which may include liquid and gas is introduced into the vaporizer 8 through a valved line 16 which connects directly into the line 14. The unvaporized material in the vaporizer 8 passes through a float valve controlled line 18 into the last vaporizer 10 which is preferably maintained at a pressure of about 700 lbs. per square inch, although a considerably lower pressure, even down to atmospheric may be employed. The distillate production which has been freed of relatively light constituents, which may include hydrocarbons boiling in the gasoline range, is withdrawn from the vaporizer 10 through a line 20 into a reboiler 22 and finally discharged through a float valve controlled line 24. The material in the reboiler is preferably subjected to a stripping operation with steam or dry gas for the removal of relatively low boiling constituents not desired in the product removed through the line 24.

The pressure reduction through the series of vaporizers 4, 6, 8 and 10 may be varied considerably, depending more or less upon the pressure of the initial production mixture in the line 2. The pressures may run respectively 1500 lbs., 700 lbs., 300 lbs., and 10 lbs., but the higher the pressures maintained in the recovery system the less pressure will be required for compressing the residue gas and returning it through inlet wells to the producing formation.

The vapors separated out in the vaporizers 4, 6, 8 and 10, which are preferably provided with packed sections as illustrated, for refluxing purposes, are conducted respectively through valved vapor lines 26, 28, 30 and 32 into the lower portion of absorber towers 34, 36, 38 and 40, which are provided with packed contact sections as illustrated. It is to be understood of course that instead of using packed towers, the usual bubble cap trays may be substituted. Lean absorption oil which is preferably a rather heavy oil such as straw oil or gas oil is conducted through a valved line 42 and sprayed into the upper portion of each of the absorbers from valved connecting lines 44, 46, 48 and 50.

The unabsorbed gases are discharged from the series of absorbers respectively through pressure valve controlled lines 52, 54, 56 and 58, the gas from the high pressure absorbers 34 and 36 being placed under a pressure of from 3000 to 4000 lbs. per square inch and returned to the producing formation through inlet wells. Since the absorbers 34 and 36 are maintained at such high pressures, the power required to return the gas therefrom to the producing formation will be relatively low. In fact, with some recycling operations, the pressures in these absorbers will be almost as high as the pressure in the producing formation, so that except for pressure drops in the gas transmission lines and in the formation itself, very little extra power will be required for boosting the pressure on the gas in the lines 52 and 54. The relatively low pressure gas discharged through lines 56 and 58 may be used to supply fuel in the plant, any excess being returned to the producing formation if desired. The fat absorption oil reaching the bottom of the absorbers 34, 36 and 38 is preferably withdrawn respectively through float valve controlled lines 60, 62 and 64, and introduced into the midportion of the next lower pressure absorber as shown. The reduction in pressure on the fat oil mixtures in the lines 60, 62 and 64 will cause vaporization of certain constituents and cooling of the unvaporized portion of the constituents including the absorption oil so that very effective absorption will take place in the lower portions of the absorbers 36, 38 and 40. Sufficient lean absorption oil is introduced into the upper portions of the absorbers to recover substantially all of the $C_3$ and higher molecular weight hydrocarbons.

The final mixture of fat absorption oil is recovered in the lower portion of the absorber 40, withdrawn therefrom through a line 66 provided with a float valve controlled pump 68 and forced through a heat exchanger 70 in which it is preheated, and then conducted through a line 72 into a still 74 in which the absorption oil is stripped of absorbed constituents. The lean absorption oil is withdrawn from the still 74 through a line 76 which includes a float valve controlled pump 78, and conducted through heat exchanger 70, a cooler 80 and then through a line 82, into the absorption oil supply line 42.

The absorbed constituents separated out as vapors in the still 74 and which may include kerosene, gasoline and lighter constituents such as $C_3$ and $C_4$ hydrocarbons, are conducted through a vapor line 84 into the lower midportion of a fractionating tower 86 and therein subjected to rectification for the production of any desired boiling range product or products. For example, the material lighter than the normal gasoline range constituents may be taken overhead through a vapor line 88, subjected to condensation in a condenser therein, and discharged into a receiver 90 from which uncondensed gas is discharged through a pressure valve controlled line as shown, while the condensate product is withdrawn through a float valve controlled line 92. A portion of the product in the line 92 may be used in the top of the tower 86 as reflux by conducting it through a valved line 94. A gasoline product may be withdrawn from the side of the tower 86 through a valved line 96 while a heavier product such as kerosene or light gas oil or furnace oil may be withdrawn through a reboiler 98 provided with a float valve controlled discharge line 100.

The absorbers 36, 38 and 40 are each provided with two packed sections for intimate contact between absorption oil and gases, one packed section in each absorber being above the inlet from the preceding absorber, and the other packed section being below that inlet.

If any of the absorbers or any part of the fractionating equipment should be placed out of commission or out of operating condition, it would not be necessary to close down the whole plant since the production introduced through lines 2 or 2 and 16 could be continued for the production of distillate while the lines 26, 28, 30 and 32 could be closed, the gas of course in that case being withdrawn through auxiliary lines, not shown, and passed directly to compressors for return to the formation through the regular inlet wells.

Various other changes are possible in the operation, and it is to be understood that any such variations are to be included in the appended claims.

Having described the invention in its preferred form, what is claimed as new is:

1. The process of recovering valuable hydrocarbon products from a liquid and gaseous hydrocarbon mixture such as obtained from distillate-producing formations including liquid hydrocarbons boiling as high as 550° F. and $C_1$, $C_2$, $C_3$ and $C_4$ hydrocarbons, which comprises passing the hydrocarbon mixture from the formation at a high superatmospheric pressure directly into the first of a series of flash vaporizing zones maintained at progressively lower pressures in each of which a gas and vapor fraction is separated from unvaporized liquid oil constituents, maintaining a high superatmospheric pressure in the first flash vaporizing zone, passing unvaporized liquid from each zone into the next vaporizing zone of the series and flash-distilling it therein, recovering a finished liquid oil product from the final vaporizing zone, passing the gases and vapors separated out in each flash-vaporizing zone into independent absorption towers wherein the gases and vapors pass countercurrent to and in intimate contact with absorption oil, maintaining the conditions in each of said absorption towers such as to absorb and recover $C_3$ and $C_4$ hydrocarbons as well as higher boiling hydrocarbons from the gases and vapors introduced thereinto while eliminating lower molecular weight hydrocarbons from each tower, maintaining progressively lower pressures through the absorption towers in a direction corresponding to the flow of liquid constituents through said series of flash-vaporizing zones, passing fat absorption oil from each absorption tower except the last into the intermediate portion of the next absorption tower in the series in the direction of decreasing pressure, and collecting the fat absorption oil from all of the absorption towers and recovering the absorbed hydrocarbons from the absorption oil.

2. The process of recovering valuable hydrocarbon products from a liquid and gaseous hydrocarbon mixture such as obtained from distillate-producing formations including liquid hydrocarbons boiling as high as 550° F. and $C_1$, $C_2$, $C_3$ and $C_4$ hydrocarbons, which comprises passing the hydrocarbon mixture from the formation at a high superatmospheric pressure directly into the first of a series of flash vaporizing zones maintained at progressively lower pressures in each of which a gas and vapor fraction is separated from unvaporized liquid oil constituents, maintaining a high superatmospheric pressure of at least 1500 lbs. per square inch in the first flash vaporizing zone, passing unvaporized liquid from each zone into the next vaporizing zone of the series and flash-distilling it therein, recovering a finished liquid oil product from the final vaporizing zone, passing the gases and vapors separated out in each flash-vaporizing zone at lower pressure into independent absorption towers separate from said zones wherein the gases and vapors pass countercurrent to and in intimate contact with absorption oil, maintaining the conditions in each of said absorption towers such as to absorb and recover $C_3$ and $C_4$ hydrocarbons as well as higher boiling hydrocarbons from the gases and vapors introduced thereinto while eliminating lower molecular weight hydrocarbons from each tower, maintaining a high pressure in the first tower and progressively lower pressures through the absorption towers in a direction corresponding to the flow of liquid constituents through said series of flash-vaporizing zones, preventing the mixture of absorption oil from said towers with the unvaporized liquid in said zones, passing fat absorption oil from each absorption tower except the last into the intermediate portion of the next absorption tower in the series in the direction of decreasing pressure, and collecting the fat absorption oil from all of the absorption towers and recovering the absorbed hydrocarbons from the absorption oil.

3. In the process of recovering valuable hydrocarbons as defined by claim 1 in which the pressure maintained in each absorption tower is approximately that maintained in the vaporizing zone supplying the vapors and gases therefor.

4. The process of recovering valuable hydrocarbon products from a liquid and gaseous hydrocarbon mixture such as that obtained from distillate-producing formations including liquid hydrocarbons boiling as high as 550° F. and $C_1$, $C_2$, $C_3$ and $C_4$ hydrocarbons, which comprises passing the mixture of liquid and gaseous hydrocarbons at a high superatmospheric pressure into the first of a series of flash-vaporizing zones maintained at progressively lower pressures in each of which a gas and vapor fraction is separated from unvaporized liquid oil constituents, maintaining a high superatmospheric pressure in the first flash-vaporizing zone, passing unvaporized liquid from each zone into the next vaporizing zone of the series and flash-distilling it therein, recovering a liquid oil product from the final vaporizing zone, passing the gases and vapors separated out in each flash-vaporizing zone into separate absorption towers wherein the gases and vapors are passed countercurrent to and in intimate contact with absorption oil, introducing a relatively lean absorption oil into the upper portion of the absorption towers, maintaining progressively lower pressures through the absorption towers in a direction corresponding to the flow of liquid constituents through said series of flash-vaporizing zones, maintaining the conditions in each of said absorption towers such as to absorb and recover $C_3$ and $C_4$ hydrocarbons as well as higher boiling hydrocarbons from the gases and vapors introduced thereinto while discharging lower molecular weight hydrocarbons from each tower, passing fat absorption oil from each absorption tower except the last into the intermediate portion of the next absorption tower in the series in the direction of decreasing pressure, and flashing the fat absorption oil in the intermediate portion of such tower at lower pressures, and collecting the fat absorption oil from all of the absorption towers as a separate product, and recovering the absorbed hydrocarbons therefrom.

DAVID G. BRANDT.